United States Patent [19]

Raftis et al.

[11] Patent Number: 4,607,663
[45] Date of Patent: Aug. 26, 1986

[54] INVERSION-RESISTANT, READILY-OPENABLE TIDE GATE VALVE

[75] Inventors: Spiros G. Raftis, Pittsburgh, Pa.; George W. Merritt, Akron, Ohio

[73] Assignee: Red Valve Co., Inc., Carnegie, Pa.

[21] Appl. No.: 754,820

[22] Filed: Jul. 12, 1985

[51] Int. Cl.$^4$ ............................................. F16K 15/16
[52] U.S. Cl. .................................... 137/846; 137/847; 137/850
[58] Field of Search ............... 137/846, 847, 848, 849, 137/850

[56] References Cited

U.S. PATENT DOCUMENTS

| Re. 27,399 | 6/1972 | Urso | 137/850 X |
|---|---|---|---|
| 187,411 | 2/1877 | Painter | 137/850 |
| 3,422,844 | 1/1969 | Grise | 137/847 |
| 4,492,253 | 1/1985 | Raftis | 137/849 |

FOREIGN PATENT DOCUMENTS 333276  2/1921  Fed. Rep. of Germany ...... 137/846

Primary Examiner—Robert G. Nilson
Attorney, Agent, or Firm—Kirschstein, Kirschstein, Ottinger & Israel

[57] ABSTRACT

A tide gate valve has staggered pads embedded therein to provide sufficient strength to resist sagging and inversion, and to provide sufficient flexibility to promote an easy opening of the valve.

5 Claims, 3 Drawing Figures

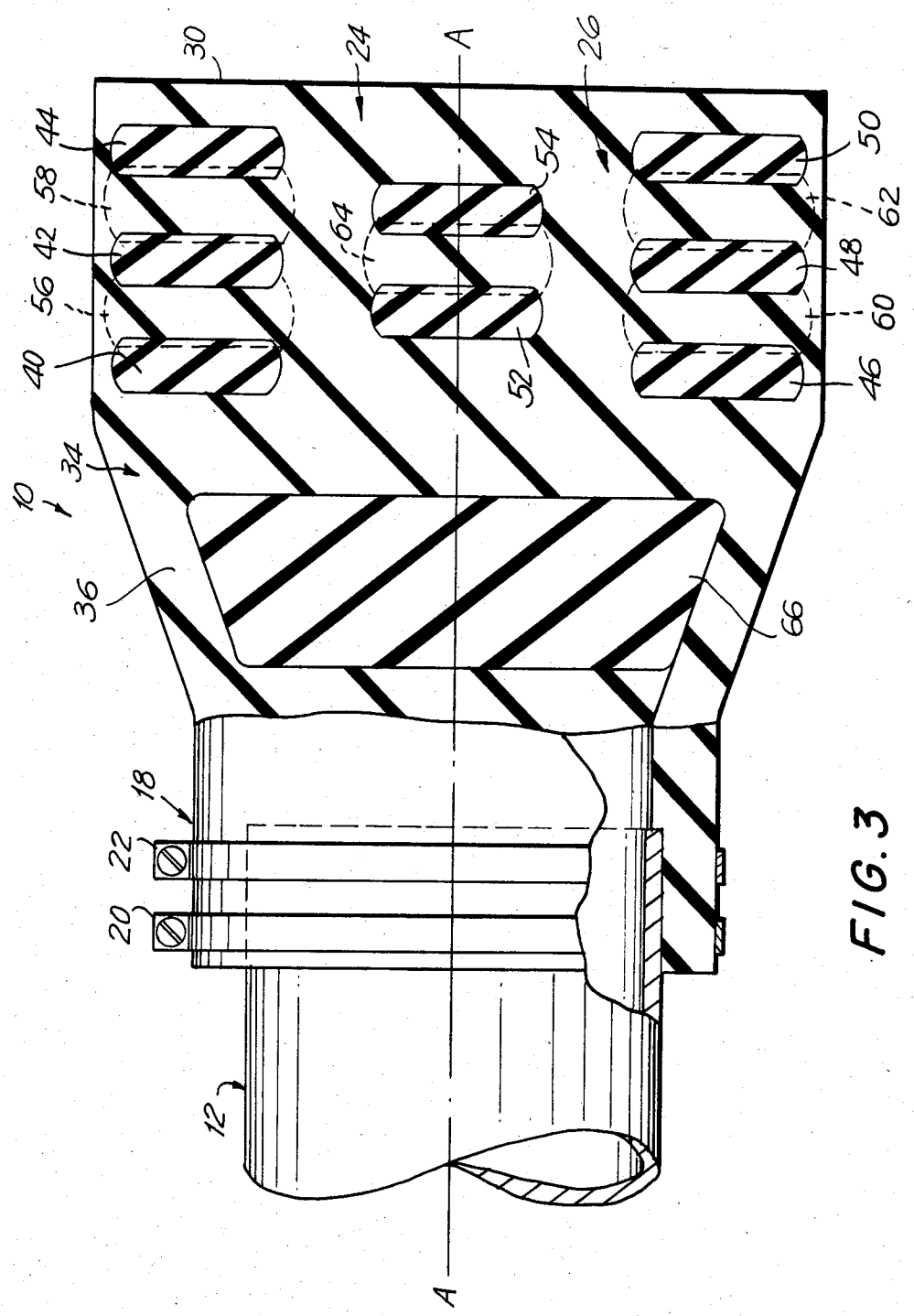

INVERSION-RESISTANT, READILY-OPENABLE TIDE GATE VALVE

BACKGROUND OF THE INVENTION

1. Field of the Invention

This invention generally relates to a tide gate valve and, more particularly, to such valves for use on large-sized storm sewer pipes having diameters on the order of 24 inches.

2. Description of the Prior Art

A check valve is essentially a valve which allows fluid flow in only one direction through a conduit, while closing and preventing back or reverse flow, when back pressure builds up downstream of the valve to a level greater than the initial fluid pressure head. One variety of check valve which has been developed in recent years entails a flexible, resilient sleeve which terminates with a symmetrically tapered duck-bill configuration and a rectilinear outlet end which opens to an oval or circular shape to accommodate successively greater fluid flow, but which closes on back pressure build-up. One problem with such valves, especially in larger sizes, is that when a high back pressure is induced, the duck-bill sleeve collapses and inverts, thus permitting back flow of fluid.

The fluid back-flow problem is especially acute when such valves are used to handle storm sewer effluent. Virtually all municipalities near waterways have storm sewer pipes which empty into the waterways. When there is a storm, storm water from the streets runs into these sewer pipes and flow into the waterways. When the tide is in, these sewer pipes back fill with the water from the waterway. This leaves no or reduced storage capacity in the sewer pipes. In the event there is a large cloudburst or storm during the time that the tide is in, all or a portion of the storm water cannot get into the sewer because the sewer pipes are at least partially filled. This causes street flooding.

To deal with the street flooding problem, various types of tide gate valves have been proposed. One type consists of a wooden gate which floats up when the tide comes in, thereby closing the tide gate valve to prevent the sewer pipes from filling with the tide water. When the tide goes out, the wooden gate sinks, thereby opening the tide gate valve. Another type consists of a mechanical tide gate valve made of steel which, however, is subject to corrosion from salt water. Such previously proposed tide gate valves are also subject to jamming when trees, logs, bricks and the like get into the valves and prevent the gates from fully closing.

For large-sized sewer pipes on the order of 24 inches or even greater diameter, one design problem is inversion, because the larger the diameter of the valve, the larger the area of the valve and, in such cases, even a low back pressure multiplied times a large valve area will invert and collapse the flexible sleeve of the valve, thus allowing reverse flow of fluid to take place. A related design problem concerns the ease of opening the valve. The more one attempts to design the valve to resist inversion, the less easy the valve is to open. Thus, if one constructs the valve with rigid materials, the valve will certainly resist inversion and sagging, but at the expense of opening the valve. The reverse situation also is true. That is, if one constructs the valve with very flexible materials, the valve will certainly open easily, but at the expense of resisting inversion and of causing the valve to sag.

An improved tide gate check valve suitable for large-sized conduits such as storm sewer pipes was disclosed in U.S. Pat. No. 4,492,253 and in our allowed U.S. patent application Ser. No. 754,819, filed July 12, 1985, entitled INVERSION-RESISTANT TIDE GATE VALVE, and assigned to the same assignee as the instant application.

SUMMARY OF THE INVENTION

1. Objects of the Invention

It is a general object of this invention to provide a reliable, improved tide gate valve for large-sized conduits which resists inversion and sagging in use, but which nevertheless opens easily.

It is another object of this invention to provide a self-supporting tide gate valve for large-sized conduits.

It is a further object of this invention to provide such a tide gate valve which is wear-resistant to raw, unscreened sewage and like fluids.

It is still another object of this invention to provide such a tide gate valve which opens and closes in response to a predetermined minimum pressure differential between the interior and exterior of the sleeve, but which nevertheless is highly resistant to inversion and sagging.

2. Features of the Invention

In keeping with these objects and others which will become apparent hereinafter, one feature of this invention, briefly stated, resides in an inversion-resistant tide gate valve for sewage conduits, particularly for large-sized sewer pipes, which comprises a sleeve bounding a longitudinally-extending flow-through passage for sewage fluids. The sleeve has an upstream fluid inlet end region mountable on a discharge end of a sewage conduit which is elongated along an axis of symmetry. The sleeve also has a downstream fluid outlet end region which has an upper lip and a lower lip opposed to each other and symmetrically arranged relative to the axis. The lips are movable from a closed position in which the lips sealingly engage each other, to an open position in which the lips are located apart from each other in response to a pressure head within the passage and exerted in a direction downstream of the passage. The sleeve further has a tapered intermediate region which has an upper wall and a lower wall symmetrically arranged relative to the axis. The upper and lower walls respectively merge, and are jointly movable, with the upper and lower lips.

In further accordance with this invention, the sleeve is constituted, at least in part, of a flexible material, and a plurality of pads are arranged along the upper and lower walls and lips of the sleeve. Each pad is constituted of a material less flexible than the flexible material of the sleeve for imparting strength thereto to prevent the sleeve from sagging and to prevent the lips from inverting in response to a back pressure exerted in a direction downstream of the passage. The pads are spaced apart from each other to bound therebetween flexible hinge regions at which the upper and lower walls and lips are bendable for imparting flexibility to the sleeve to enable the lips to move readily from the closed to the open position in response to the pressure head.

In an advantageous construction of this invention, the pads on the upper lip are staggered relative to the pads on the lower lip, and all the pads are embedded in the flexible material of the sleeve. Additional strength may be imparted to the sleeve by providing additional longitudinally-extending pads on the upstream fluid inlet end region. At least some of the pads have a generally rectangular outline and generally lie in a plane.

Another feature of this invention resides in embedding at least one reinforcing ply within the sleeve. The reinforcing ply extends along the entire length of the sleeve and is operative for resisting outward bulging and deformation of the sleeve in response to high pressure heads within the passage.

Thus, in accordance with this invention, the pads impart the required strength to the sleeve to prevent the sleeve from sagging and to prevent the valve from inverting. At the same time, the lips of the valve are readily openable in response to a pressure head of a predetermined minimum magnitude due to the provision of the flexible hinge regions between the spaced-apart pads, since both the upper and lower walls and lips are bendable at each of these hinge regions. Hence, a reliable, improved tide gate valve for large-sized conduits which opens easily, resists inversion and resists sagging is proposed by this invention.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 3 is a sectional view taken on line 3—3 of FIG. 2.

DETAILED DESCRIPTION OF THE PREFERRED EMBODIMENTS

Figure 2:
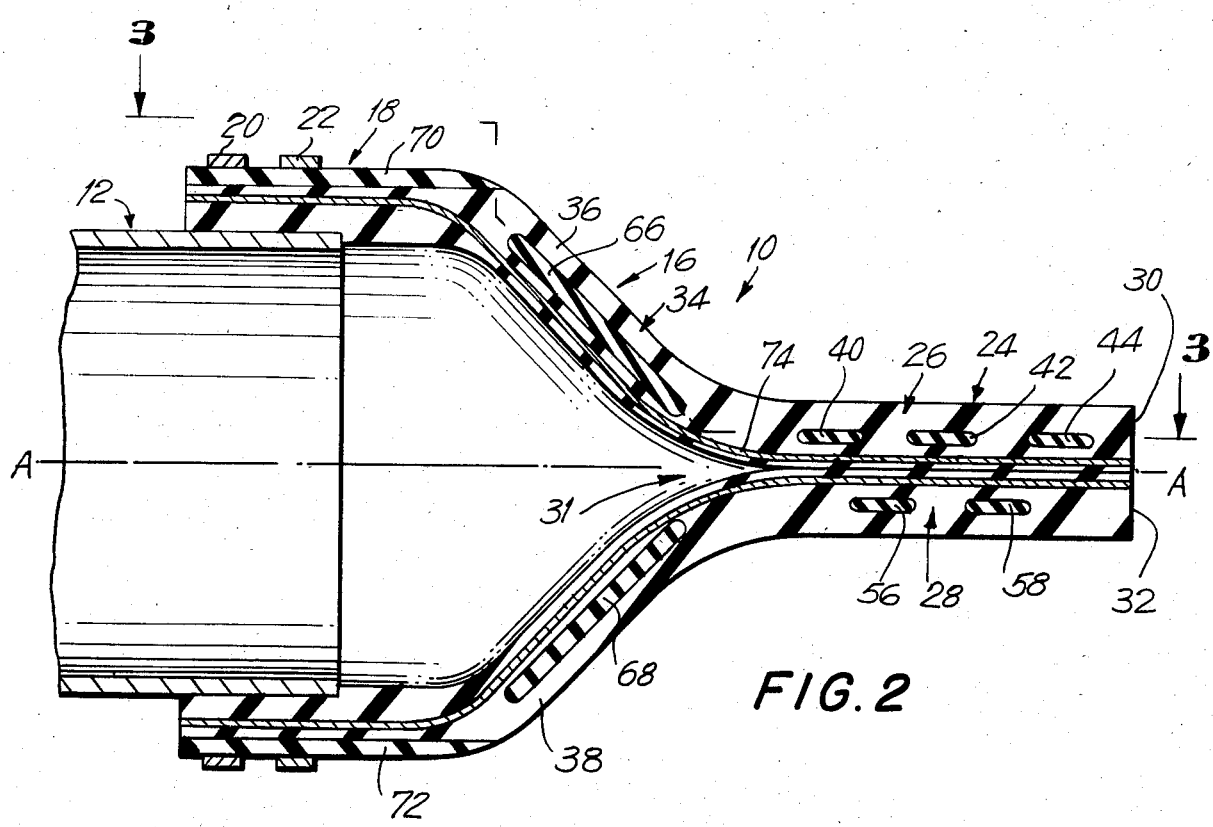
FIG. 2 is a sectional view taken on line 2—2 of FIG. 1, showing the valve mounted at a discharge end of a partially broken-away conduit.
Figure 1:
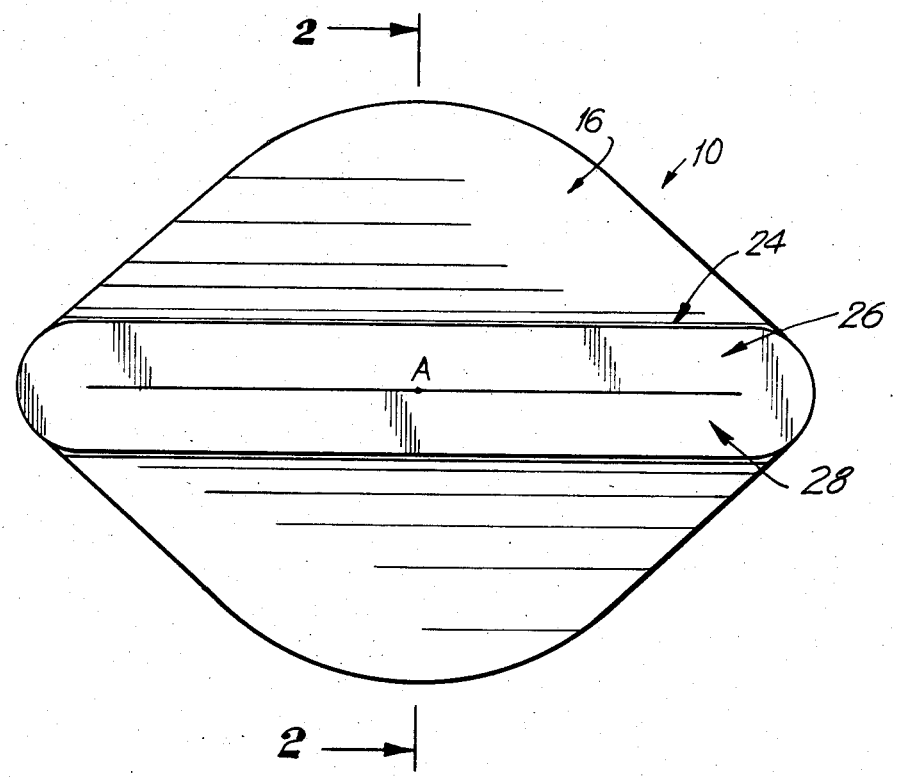
FIG. 1 is a front view of a tide gate valve in accordance with this invention.

Referring now to the drawings, reference numeral 10 generally identifies a tide gate valve mounted at a discharge end of a conduit 12 from which fluids are discharged. The conduit 12 may be a storm sewer pipe, an industrial waste pipe, or any pipe which discharges an effluent into a river, creek, ocean, or analogous waterway.

The valve 10 includes a flexible, resilient sleeve 16 which bounds a longitudinally-extending flow-through passage for the effluent sewage fluids which may be a liquid or slurry, such as raw sewage, storm rain water, lime, sludge, chemical slurry, scum paper stock, tailings slurry, or any industrial waste. As shown in FIG. 2, the sleeve 16 has a generally cylindrical upstream fluid inlet end region 18 mounted on and around the discharge end of the conduit 12. A pair of hold-down straps 20, 22 lockingly encircle the upstream region 18 and fix the position of the same. The conduit 12 is elongated along a longitudinal axis of symmetry A—A about which the upstream region 18 extends.

The sleeve 16 also has a downstream fluid outlet end region 24 which is comprised of an upper lip 26 and a lower lip 28. The lips are flattened, and have broad, planar mating surfaces facing and opposed to each other. The lips extend over a predetermined length in mutual contact with each other from a so-called boot region 31 of the sleeve all the way to a pair of end faces 30, 32 at the extreme outer ends of the lips 26, 28. The lips are symmetrically arranged relative to the axis A—A. The lips are normally in the illustrated closed position in which the lips sealingly engage each other. In response to a pressure head of a predetermined minimum magnitude exerted in the downstream direction of the passage such that the pressure inside the passage, due to the fluid flow therethrough, is greater than the pressure outside the passage, the lips are movable apart from each other in a transverse direction generally perpendicular to their mating surfaces, to an open position in which the fluid within the passage may flow past the opened lips to the exterior of the sleeve. When the fluid flow ceases, or when a back pressure is exerted in the upstream direction of the passage such that the back pressure is greater by a predetermined amount than the internal pressure, then the lips move toward each other and return to the closed position. In the event that the back pressure is considerably higher than the internal pressure as a result, for example, as when the tide is in, then the valve is designed, as explained below, to resist such back pressure forces from inverting the lips and redirecting them to extend upstream into the passage.

The sleeve 16 also has a tapered intermediate region 34 located between the inlet region 18 and the outlet region 24. The tapered region 34 has an upper body wall 36 which merges and is jointly movable with the upper lip 26, and a lower body wall 38 which merges and is jointly movable with the lower lip 28. As best shown in FIG. 2, the upper and lower walls 36, 38 converge in a downstream direction toward the axis A—A at the same slope before merging with the upper and lower lips which lie in a horizontal plane on either side of and lying generally parallel to the axis. In a preferred embodiment, wherein the inlet region 18 fits around a conduit having an internal diameter on the order of 24 inches, the slope is about 45°. As best shown in FIG. 3, the upper and lower walls 36, 38 flare outwardly in a downstream direction before merging with the upper and lower lips. In the preferred embodiment, this outward flaring is on the order of 20°. In use, the upper wall 36 and the upper lip 26 move upwardly to the same extent as the lower wall 38 and the lower lip 28 move downwardly.

In accordance with this invention, a set of pads 40, 42, 44 are embedded in the upper lip 26 at the right side thereof, a set of pads 46, 48, 50 are embedded in the upper lip 26 at the left side thereof, and a set of pads 52, 54 are embedded in the upper lip 26 at the center thereof. Also, a set of pads 56, 58 are embedded in the lower lip 28 at the right side thereof, a set of pads 60, 62 are embedded in the lower lip 28 at the left side thereof, and a pad 64 is embedded in the lower lip 28 at the center thereof. It will be noted that the pads embedded in the lower lip are staggered relative to the pads embedded in the upper lip. For example, center pads 52, 54 are spaced apart from each other and bound therebetween a space in the upper lip. The pad 64 is located below this space in the lower lip. The same situation is true for the other pads in the lower lip, in that each pad in the lower lip is juxtaposed with and spans a respective space formed between pads in the upper lip.

An additional set of pads 66, 68 are respectively embedded in the upper and lower walls 36, 38. The pads 66, 68 are juxtaposed and are symmetrically arranged relative to each other.

An annular pad having upper and lower portions 70, 72 is arranged along and at the exterior of the inlet end region 18 underneath the straps 20, 22.

All of the aforementioned pads are made of a material which is less flexible than the material of the sleeve. In a preferred construction, the sleeve is made of 30 durometer rubber, whereas each pad is made of 90 durometer rubber.

The spaced-apart arrangement and placement of the pads along the length of the sleeve imparts strength, rigidity and body to the sleeve to prevent the sleeve from sagging, particularly when sewage flows through the valve. In addition, the pads prevent the lips from inverting in response to back pressure. Furthermore, the spaces between the pads form flexible hinge regions at which the portions of the sleeve in these regions are bendable. These hinge regions, i.e. where there are no pads, impart flexibility to the sleeve to enable the lips and the walls to readily move from the closed to the open position in response to a pressure head of a predetermined minimum magnitude. Thus, the sleeve is not only flexible enough to easily open, but is also strong enough to resist inversion and sagging.

As best shown in FIG. 3, each pad in the lips is planar and has a generally rectangular outline, and each pad in the walls is planar and has a generally trapezoidal outline. Other configurations are, of course, within the spirit of this invention.

One or more reinforcing plies 74 are likewise embedded in the sleeve, and each such ply extends around the sleeve and longitudinally along the entire length of the same. The plies 74 prevent the sleeve from bulging outwardly and deforming in the event of a pressure head having a large magnitude.

It will be understood that each of the elements described above, or two or more together, also may find a useful application in other types of constructions differing from the types described above.

While the invention has been illustrated and described as embodied in an inversion-resistant, readily-openable tide gate valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An inversion-resistant tide gate valve for sewage conduits, particular for large-sized storm sewer pipes, comprising:
   (a) a sleeve bounding a longitudinally-extending flow-through passage for sewage fluids,
   (b) said sleeve having an upstream fluid inlet end region mountable on a discharge end of a sewage conduit which is elongated along an axis of symmetry,
   (c) said sleeve having a downstream fluid outlet end region which has an upper lip and a lower lip opposed to each other and symmetrically arranged relative to the axis, said lips being movable from a closed position in which the lips sealingly engage each other, to an open position in which the lips are located apart from each other in response to a pressure head within the passage and exerted in a direction downstream of the passage,
   (d) said sleeve having a tapered intermediate region which has an upper wall and a lower wall symmetrically arranged relative to the axis, said upper and lower walls respectively merging, and being jointly movable, with the upper and lower lips,
   (e) said sleeve being constituted, at least in part, of a flexible material,
   (f) a plurality of pads arranged along the upper and lower walls and lips of the sleeve, said pads being constituted of a material less flexible than the flexible material of the sleeve for imparting strength to the sleeve to prevent the sleeve from sagging and to prevent the lips from inverting in response to a back pressure exerted in a direction upstream of the passage, said pads being spaced apart from each other to bound therebetween flexible hinge regions at which the upper and lower walls and lips are bendable for imparting flexibility to the sleeve to enable the lips to readily move from the closed to the open position in response to the pressure head, first ones of the pads on the upper lip being staggered relative to second ones of the pads on the lower lip, third ones of the pads on the upper wall being symmetrically arranged relative to the axis with respect to fourth ones of the pads on the lower wall, said first, second, third and fourth ones of the pads being embedded in the flexible material of the sleeve, and an additional longitudinally-extending annular pad on the upstream fluid inlet end region for imparting additional strength to the sleeve to resist sagging of the same.

2. The valve as recited in claim 1, wherein each pad is made of rubber having a durometer of about 90, and wherein the flexible material of the sleeve is made of rubber having a durometer of about 30.

3. The valve as recited in claim 1, wherein the pads embedded in the upper wall and lip overlie hinge regions in the lower wall and lip.

4. The valve as recited in claim 1, and further comprising at least one reinforcing ply embedded within the sleeve and extending along the entire length of the same, for resisting outward bulging and deformation of the sleeve.

5. The valve as recited in claim 1, wherein at least some of the pads have a generally rectangular outline and generally lie in a plane.

* * * * *